United States Patent
Hoetzel

(10) Patent No.: US 6,803,882 B2
(45) Date of Patent: Oct. 12, 2004

(54) SYSTEM FOR CONTROLLING RIGHT OF ACCESS TO A VEHICLE

(75) Inventor: Juergen Hoetzel, Florstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/257,562

(22) PCT Filed: Apr. 5, 2001

(86) PCT No.: PCT/DE01/01316
§ 371 (c)(1),
(2), (4) Date: Apr. 15, 2003

(87) PCT Pub. No.: WO01/77468
PCT Pub. Date: Oct. 18, 2001

(65) Prior Publication Data
US 2003/0156068 A1 Aug. 21, 2003

(30) Foreign Application Priority Data
Apr. 11, 2000 (DE) .......................................... 100 17 973

(51) Int. Cl.[7] ................................................ H01Q 1/32
(52) U.S. Cl. ................... 343/713; 340/426.11; 342/174
(58) Field of Search ................................ 343/704, 711, 343/713; 340/426.11, 903, 933; 342/174

(56) References Cited
U.S. PATENT DOCUMENTS 5,657,008 A * 8/1997 Bantli .......................... 340/933
6,087,995 A * 7/2000 Grace et al. ................. 343/703
6,556,125 B1 * 4/2003 Rohrl ......................... 340/5.62

FOREIGN PATENT DOCUMENTS

| DE | 197 18 764 | 8/1998 |
|---|---|---|
| DE | 197 28 761 | 9/1998 |
| DE | 198 02 526 | 7/1999 |
| DE | 198 11 572 | 8/1999 |
| EP | 0 523 602 | 1/1993 |
| EP | 0 580 139 | 1/1994 |
| EP | 0 992 408 | 4/2000 |
| FR | 2 767 765 | 3/1999 |

* cited by examiner

*Primary Examiner*—Tho Phan
(74) *Attorney, Agent, or Firm*—Kenyon & Kenyon

(57) ABSTRACT

A system for verifying the access authorization to a vehicle has a vehicle-based transceiver unit which has at least two transmitting/receiving antennas spaced a distance apart in or on the vehicle, and it has a transponder unit which is set up for detection of its presence and for exchanging a predetermined identification request/response sequence through or with the transceiver unit within a predetermined detection area in or around the vehicle, wherein the transceiver unit has calculation/analyzing means which perform the detection of a position of the transponder unit by using a time and/or phase measurement based on a mathematical geometric method in response to a reply signal transmitted by the transponder and received by the at least two transmitting/receiving antennas in response to the identification request.

7 Claims, 1 Drawing Sheet

SYSTEM FOR CONTROLLING RIGHT OF ACCESS TO A VEHICLE

FIELD OF THE INVENTION

The present invention relates to a system for verifying access authorization to a vehicle, having a vehicle-based transceiver unit which has at least two transmitting/receiving antennas spaced a distance apart in or on the vehicle, and having a transponder unit which is set up for detection of its presence and for exchanging a predetermined identification request/response sequence through or with the transceiver unit within a predetermined detection area in or around the vehicle.

BACKGROUND INFORMATION

Such access authorization verification systems, i.e., passive entry systems, are available from various suppliers. They operate bidirectionally and determine the position of persons authorized or approved for a vehicle by detection of a transponder signal for interaction with it within a valid detection area.

In such an access authorization verification system as illustrated in the accompanying FIG. 1, for example, predetermined detection areas A, B and C are provided, within which a transponder T must be located, usually on the right and left sides and at the trunk of vehicle F as well as in the entire interior area of the vehicle. These detection areas A, B and C are determined by the antenna characteristic of antennas mounted on the vehicle, connected to a transceiver unit E, and by the delivery/reception of the transmitting/receiving power of the transponder and the vehicle antennas. A disadvantage of this is that large, complex and expensive vehicle antennas are needed for this purpose. The power output of transponder T may also vary as a function of the temperature and the prevailing battery voltage of the transponder.

In addition, a great effort must be expended in protecting against transponder attacks to prevent unauthorized access to the vehicle.

A device described in German Published Patent Application No. 198 02 526 (assigned to Robert Bosch GmbH) for verifying access authorization involves a time determination, which determines a period of time beginning with transmitting the identification request until receiving the response signal. The period of time thus determined is compared with a limiting value, and access authorization is enabled only if this period of time is less than the limiting value.

SUMMARY OF THE INVENTION

The object of the present invention is to avoid the use of large and expensive vehicle antennas on such an access authorization verification system, to make the antenna structure simpler and less expensive, to improve system reliability and to eliminate the possibility of transponder attacks.

The above object is achieved according to an aspect of the present invention by the fact that the transceiver unit has a calculation/analyzing device which performs the detection of a position of the transponder unit by using a time and/or phase measurement based on a mathematical geometric method in response to a reply signal transmitted by the transponder and received by the at least two transmitting/receiving antennas in response to the identification request.

Due to the time and/or phase measurement method performed in the access authorization verification system according to the present invention, the antenna structures are simplified and made less expensive, a higher transmission power of the transponder is made possible and at the same time transponder attacks are made impossible. It is thus possible to defend against the use of a transmission system by an unauthorized person.

In Europe, a frequency band at 433 MHz is allowed by postal authorities for use of transponders, e.g., for automotive key systems, and in the United States a frequency band at 350 MHz is allowed. The transmitting/receiving antennas used in the present invention may be designed as monopoles for these frequencies. These are linear antennas having a ground reference on one side which may be mounted, for example, on the right and left in the rear window and on one side of the front window. The length is approximately 17 cm for the European market and approximately 24 cm for the United States market.

To reduce the size of the antennas and increase the bandwidth allowed by postal authorities, the frequency may be increased with the in the system according to the present invention. Approved ISM frequency bands at 1.25 GHz and 2.4 GHz are preferred here.

According to the present invention, two or even three (which further increases system reliability) transmitting/receiving antennas may be provided on the vehicle.

The calculation and analyzing device of the transceiver unit is set up to measure on at least two transmitting/receiving antennas a transit time difference between transmitting an identification request by a transmitting/receiving antenna and detection of the receipt of the receipt of the identification response transmitted subsequently by the transponder unit. With this measured transit time difference, it is possible to determine the transponder position relative to an unambiguously defined vehicle zero point by using the mathematical geometric method proposed according to the present invention. Internal signal transit times, which are assumed to be constant and of equal length for processing the identification response received by the transceiver unit from the various transmitting/receiving antennas may be used. Likewise, the transponder-internal transit time from reception of the identification request until transmission of the identification response may also be assumed to be constant.

The accuracy, i.e., resolution, during the position determination may be further improved if the calculation and analyzing device also executes a position determination based on a phase analysis in addition to the position determination based on the transit time difference. The phase difference of the identification response received at the multiple transmitting/receiving antennas in response to the transmission of the identification request is determined. The phase measurement is usable to advantage in particular at frequencies in the low megahertz range because wavelength $\lambda$ is correspondingly large here. A high-precision time measurement is advantageously unnecessary.

A very advantageous effect of the time measurement method is that the electromagnetic waves travel 30 cm in 1 ns, i.e., a distance of 15 cm within the atmosphere. Access to the vehicle is denied if the measured transit time is greater than a predetermined maximum time, which is composed of the transit time for the distance and the internal transit times.

DETAILED DESCRIPTION

In the case of an embodiment according to the present invention, three vehicle antennas $E_1$, $E_2$ and $E_3$ are each connected to a transceiver unit E. It should be pointed out that although the embodiment described below uses three transmitting/receiving antennas, an access authorization verification system according to the present invention may also be implemented using two antennas, which may be located in the rear window and in a side window, for example.

Figure 1:
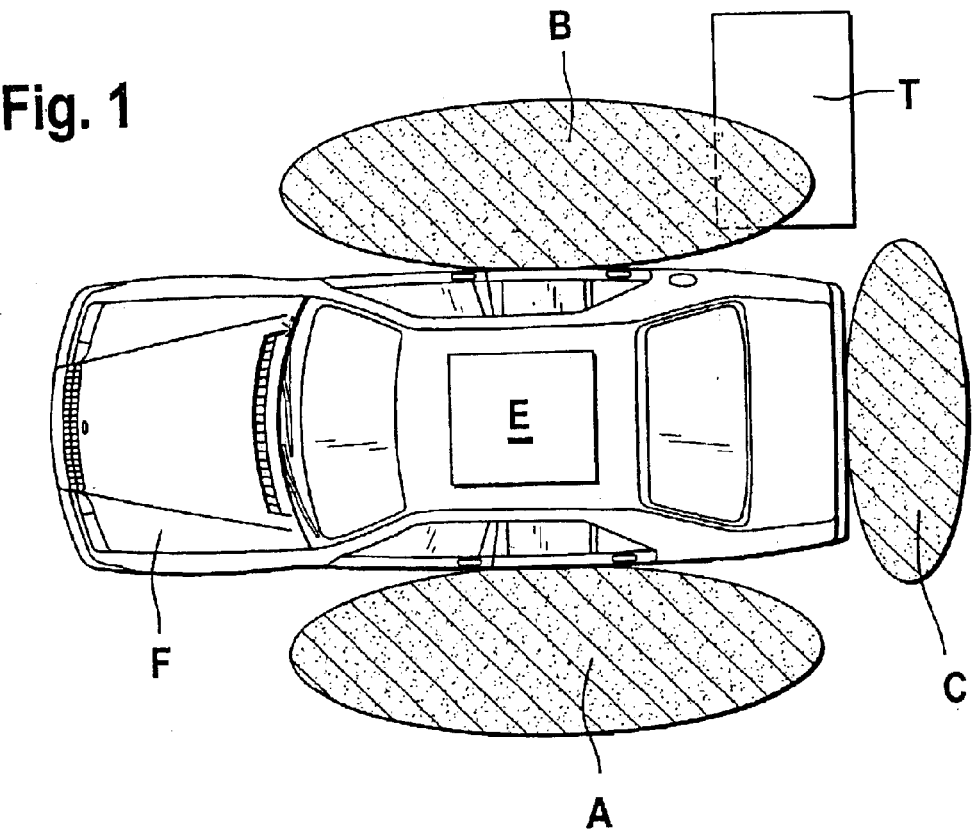
FIG. 1 schematically shows detection areas outside of a vehicle for detection of the position of a transponder, as already explained.
Figure 2:
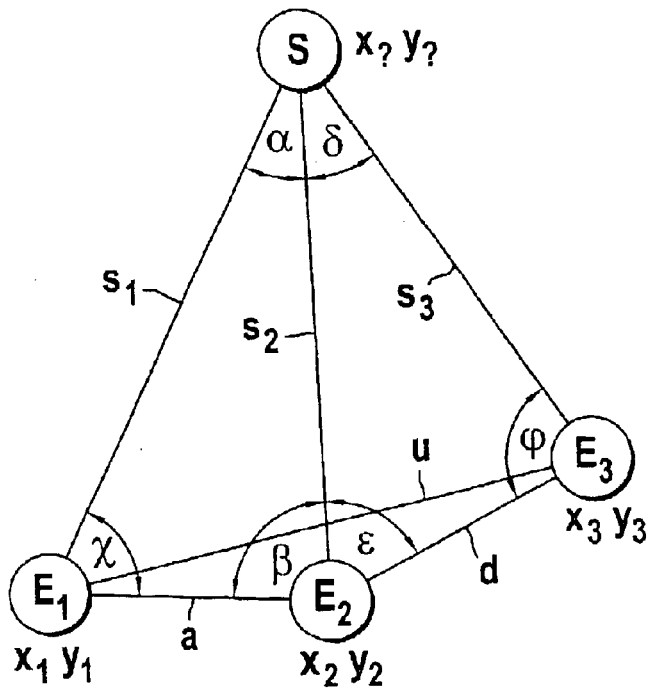
FIG. 2 graphically shows a model of the mathematical geometric position determination method executed by the calculation and analyzing device as proposed according to the present invention.

Reference is made now for the following description to the graph in FIG. 2, illustrating a model of the mathematical geometric position determination method.

If a transponder T is at a position S in the reception range of antennas $E_1$, $E_2$, $E_3$, then a bidirectional communication between transceiver unit E and transponder unit T is established within the access authorization verification system. Within this communication, the vehicle transmits an identification request for immediate response from an antenna $E_1$ or $E_2$ or $E_3$ to transponder T. The time between transmitting and receiving the identification request is measured by a calculation/analyzing device (not shown in the drawing) provided in transceiver unit E. The time required by transponder T to process the command is constant and is known to the system. In addition, the system also knows the internal transit time in the transceiver unit, e.g., for processing and transmitting the identification request, for reception and amplification of the signal, for transmission over the antenna line, etc. The internal transit times in the vehicle-based system part are also constant in good approximation.

The time between transmitting the identification request and receiving the transponder response is thus composed of the following times:

$t_{FAA1}$—vehicle-internal time processing and transmission of the identification request, e.g., via antenna E1, $t_{s1}$—transit time between vehicle antenna E1 and transponder T, $t_T$—processing time inside transponder T, $t_{s1}$—transit time between transponder T and vehicle antenna E1 and $t_{FEA1}$—transit time for processing reception by antenna E1 on the vehicle.

$$t_m = t_{FAA1} + 2t_{s1} + t_T + t_{FEA1} \text{ where } t_{FAA1}, t_T, t_{FEA1} = \text{constant} \quad (1)$$

Relevant time $t_1$ is measurement time $t_m$ according to equation (1) minus the constant transit time components. It thus holds that:

$$2 * S_1 = C * t_1 \quad (2)$$

For reception via antennas $E_2$ and $E_3$ it holds by analogy:

$$2 * S_2 = C * t_2 = C * (t_1 + \Delta t_{21}) \text{ where } t_2 = t_1 + \Delta t_{21} \quad (3)$$

and $$2 * S_3 = C * t_3 = C * (t_1 + \Delta t_{31}) \text{ where } t_3 = t_1 + \Delta t_{31} \quad (4)$$

In equations (1) through (3) given above, it is assumed that the transit times in transceiver unit E for processing reception by antenna $E_1$ are equal to the corresponding transit times for processing reception by antennas $E_2$ or $E_3$. If this is not the case, the times are measured and adapted to the above formulation accordingly. However, they may be regarded as constant, as with the transit time via antenna $E_1$.

In the graphic model of FIG. 2 illustrating the geometric relationships, $E_1$, $E_2$ and $E_3$ denote the antennas with their respective positions $X_1$, $Y_2$; $X_2$, $Y_2$ and $X_3$, $Y_3$ on the vehicle, and S denotes the location of transponder T whose position $X_?$, $Y_?$ is to be determined.

The distances between antennas $E_1$, $E_2$ and $E_3$ are represented by a, d and u. The distances from antennas $E_1$, $E_2$ and $E_3$ to location S of transponder T are labeled as $S_1$, $S_2$ and $S_3$.

Furthermore, the angles of triangle $E_1SE_2$ are labeled as $\chi$, $\alpha$ and $\beta$, and the angles of triangle $E_2SE_3$ are labeled as $\epsilon$, $\delta$ and $\phi$.

On the example of angle $\chi$, the following conditions apply according to the cosine law:

$$\cos\chi = \frac{a^2 + S_1^2 - S_2^2}{2 * a * S_1} \quad (5)$$

$$\cos\chi = \frac{a}{c * t_1} \frac{c}{4 * a} * \left(2 * \Delta t_{21} + \frac{\Delta t_{21}}{t_1}\right) \quad (6)$$

and $$S_2^2 = a^2 + a^2 + S_1^2 - 2 * a * S_1 * \cos\chi \quad (7)$$

Similar equations may be formulated for the other angles.

To improve the resolution and to reduce the required bandwidth, the calculation/analyzing device may also execute a phase analysis on the basis of the response time in addition to performing the distance determination described above. This is advantageous in particular in the case of frequencies in the low MHz range because wavelength $\lambda$ here is correspondingly long. Another advantage is the possibility of omitting a highly accurate time measurement. The following equations hold:

$\lambda = 1/f$ $\omega = 2\pi f$, $\phi(t) = \omega t + \Delta\phi$ $$\phi_1(t) = 0,\ \phi_2(t) = \omega t + \Delta\phi_{21},\ \phi_3(t) = \omega t + \Delta\phi_{31} \quad (8)$$

One very advantageous effect of the time measurement method is that electromagnetic waves in the atmosphere travel 30 cm in one nanosecond, i.e., a distance of 15 cm. Access to the vehicle is denied if the measurement time is greater than a set maximum time, which is composed of the transit time for the distance between the vehicle and the transponder and the internal transit times.

Thus, in addition to using a simpler antenna structure, the access authorization verification system according to the present invention offers the advantage that it allows the use of a relatively high transmission power. Another advantage is that a transponder attack would no longer be successful because the time for the identification response would be exceeded in accordance with the maximum distance for unlocking the vehicle with transmission through an intermediate transmission site.

What is claimed is:

1. A system for verifying an access authorization to a vehicle, comprising:

a vehicle-based transceiver unit including at least two transmitting/receiving antennas spaced a distance apart one of in the vehicle and on the vehicle; and a transponder unit for detecting a presence of the transceiver unit and for exchanging a predetermined identification request/response sequence one of through and with the transceiver unit within a predetermined detection area one of in and around the vehicle, wherein:
the transceiver unit includes a calculation/analyzing device that detects a position of the transponder unit by using at least one of a time measurement and a phase measurement based on a mathematical geometric operation in response to a reply signal transmitted by the transponder unit and received by the at least two transmitting/receiving antennas in response to an identification request.

2. The system as recited in claim 1, wherein:
the at least two transmitting/receiving antennas include three monopole transmitting/receiving antennas on two vehicle sides and at a rear of the vehicle.

3. The system as recited in claim 1, wherein:
the calculation/analyzing device ascertains a transit time difference between transmitting the identification request by one of the at least two transmitting/receiving antennas and detecting an identification response subsequently transmitted by the transponder unit in response to receipt of the identification request, and
the calculation/analyzing device determines the position of the transponder unit from the transit time difference thus ascertained and known position coordinates of the at least two transmitting/receiving antennas relative to a defined vehicle zero point.

4. The system as recited in claim 3, wherein:
during the position determination, the calculation/analyzing device assumes internal signal transit times to be constant and of equal length in processing the identification response received by the at least two transmitting/receiving antennas.

5. The system as recited in claim 1, wherein:
the calculation/analyzing device executes a position determination based on a phase analysis in addition to a position determination based on a transit time difference, and
a phase difference of identification responses received at the at least two transmitting/receiving antennas in response to the transmission of the identification request is determined.

6. The system as recited in claim 5, wherein:
the calculation/analyzing device joins a position measurement result based on the transit time difference with a position measurement result based on a measurement of the phase difference in order to increase a resolution.

7. The system as recited in claim 1, wherein:
the system does not allow access to the vehicle if a signal transit time determined by the calculation/analyzing device is greater than a predetermined maximum time.

* * * * *